Figure 1:
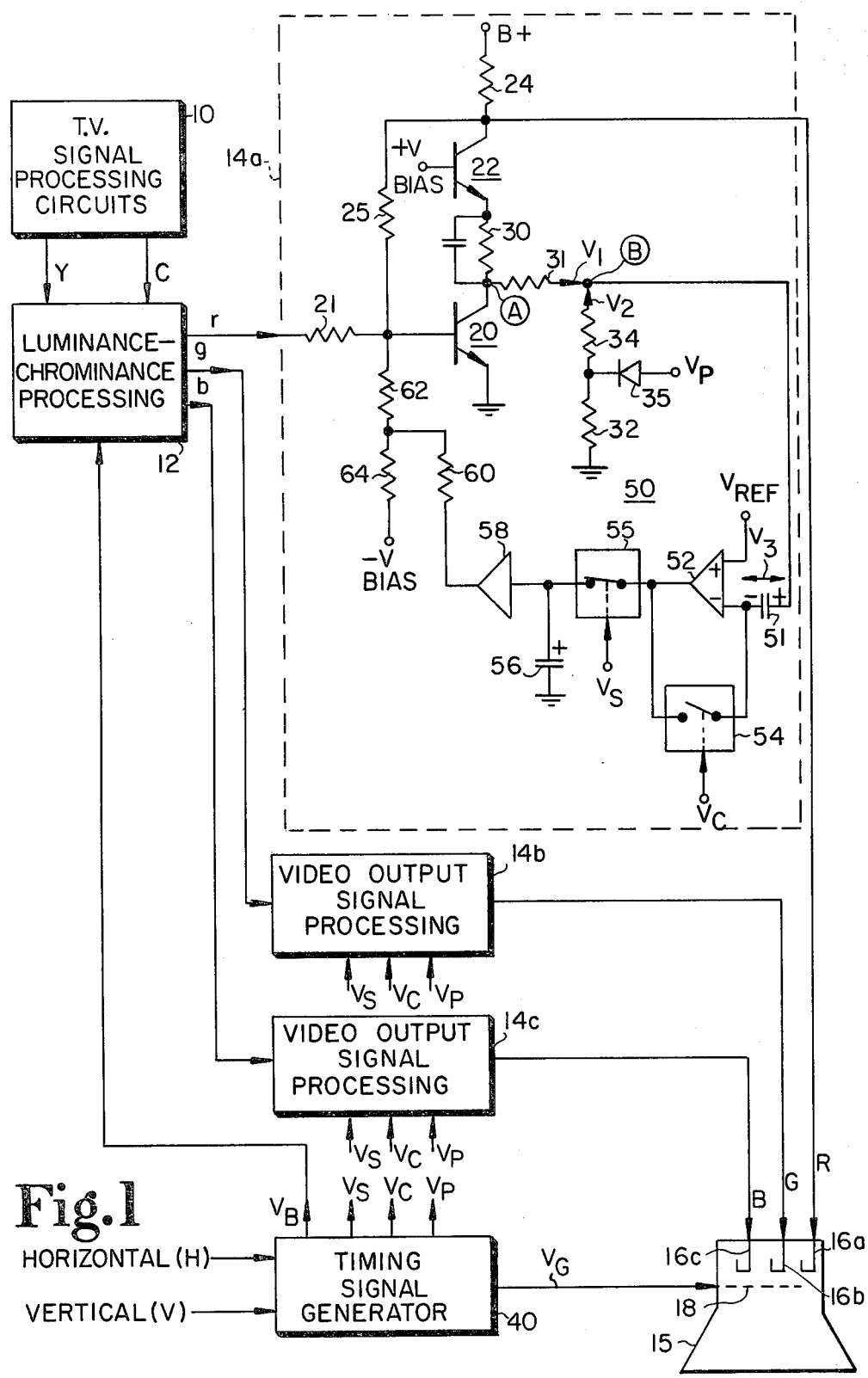

United States Patent [19]

Tallant, II et al.

[11] Patent Number: 4,484,227

[45] Date of Patent: Nov. 20, 1984

[54] AUTOMATIC KINESCOPE BIAS CONTROL SYSTEM COMPENSATED FOR SENSE POINT IMPEDANCE VARIATIONS

[75] Inventors: James C. Tallant, II; James Hettiger, both of Indianapolis, Ind.

[73] Assignee: RCA Corporation, New York, N.Y.

[21] Appl. No.: 434,329

[22] Filed: Oct. 14, 1982

[51] Int. Cl.³ .................. H04N 5/68; H04N 9/535
[52] U.S. Cl. .................... 358/242; 358/29; 358/65; 358/243
[58] Field of Search .............. 358/10, 29, 64, 65, 358/139, 168, 169, 242, 243; 307/352, 353; 328/150, 151, 168, 169, 171, 172, 175

[56] References Cited

U.S. PATENT DOCUMENTS

| | | | |
|---|---|---|---|
| 4,263,622 | 4/1981 | Hinn | 358/242 |
| 4,319,166 | 3/1982 | Lavigne | 315/384 |
| 4,331,982 | 5/1982 | Parker | 358/243 |
| 4,387,405 | 6/1983 | Hinn | 358/243 |
| 4,414,577 | 11/1983 | Tallant | 358/242 |

Primary Examiner—Tommy P. Chin
Attorney, Agent, or Firm—Eugene M. Whitacre; Paul J. Rasmussen; Ronald H. Kurdyla

[57] ABSTRACT

In an automatic kinescope bias (AKB) control system, a signal with a magnitude representative of the black current level conducted by the kinescope of a television receiver is derived from a sense point. The derived signal is coupled via a signal path to a processing network including input clamping and sampling networks for developing a bias correction voltage. A source of auxiliary control signal, coupled to the signal path prior to the clamping network, is subject to being undesirably influenced by impedance variations manifested by the sense point. An impedance included in the signal path between the sense point and the auxiliary signal source compensates for the sense point impedance variations, and also increases the immunity of the clamping network to spurious signals including noise and locally generated interference.

9 Claims, 2 Drawing Figures

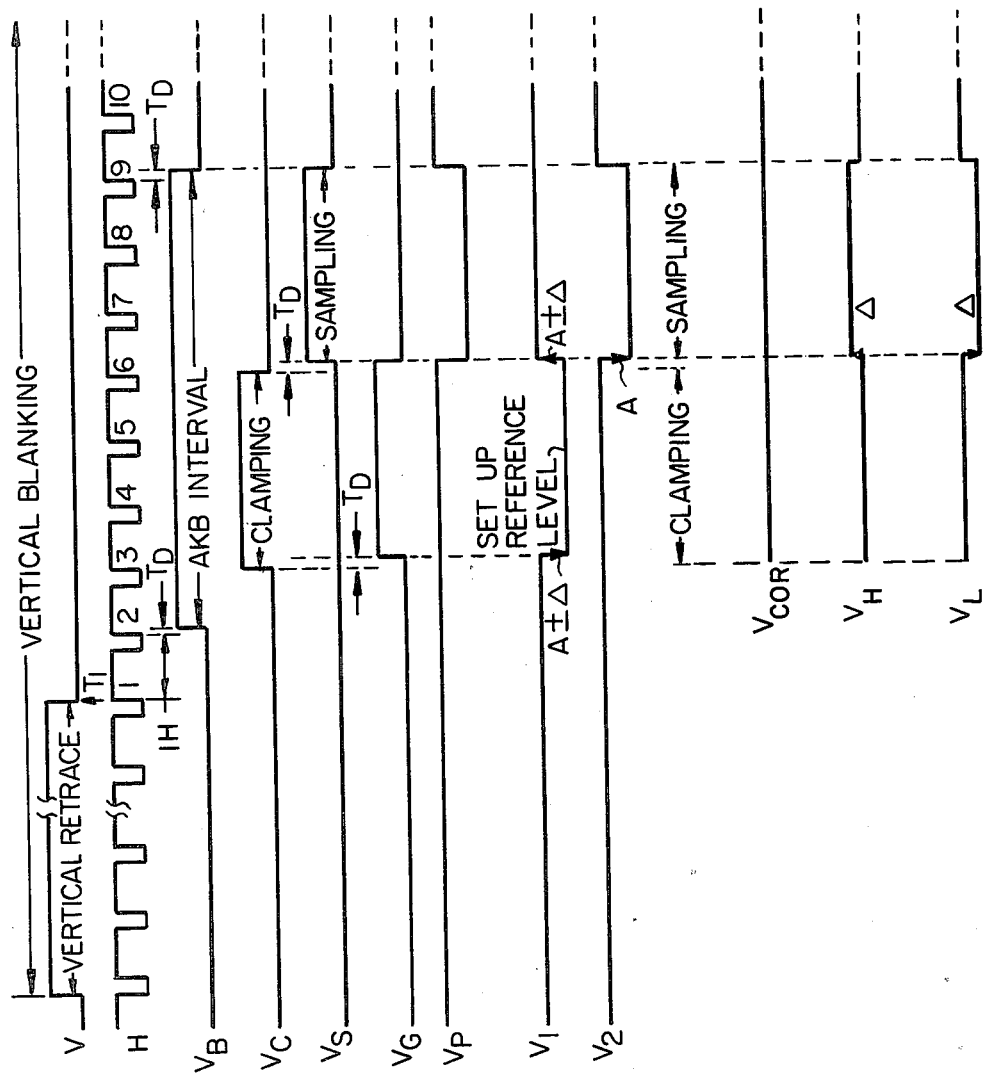

AUTOMATIC KINESCOPE BIAS CONTROL SYSTEM COMPENSATED FOR SENSE POINT IMPEDANCE VARIATIONS

This invention concerns a video signal processing system employing apparatus for automatically controlling the level of black image representative current conducted by an image reproducing device such as the kinescope of a television receiver. In particular, the invention concerns an arrangement for compensating for impedance variations at a sense point from which a black current representative signal is derived, so that such impedance variations do not impair the operation of subsequent control circuits to which the sense point is coupled.

Television receivers sometimes employ an automatic kinescope bias (AKB) control system for automatically establishing proper black image representative current levels for each electron gun of the kinescope. As a result of this operation, pictures reproduced by the kinescope are prevented from being adversely affected by variations of kinescope operating parameters (e.g., due to aging and temperature effects). One type of AKB system is disclosed in U.S. Pat. No. 4,263,622 of Werner Hinn, titled "Automatic Kinescope Biasing System."

An AKB system typically operates during image blanking intervals, at which time the kinescope conducts a small black level representative blanking current in response to a reference voltage representative of black video signal information. This current is monitored by the AKB system to generate a kinescope bias correction voltage representing the difference between the sensed black current level and a desired black current level. The correction voltage is applied to the kinescope, such as via video signal processing circuits preceding the kinescope, with a sense for reducing the difference. Typically, the correction voltage is applied to a bias control input of a DC coupled kinescope driver amplifier which supplies video output signals of a level suitable for directly driving a cathode intensity control electrode of the kinescope. The correction voltage modifies the output bias voltage of the driver amplifier, thereby modifying the cathode bias voltage, such that the desired cathode black current level results.

In an AKB system of the type described in the aforementioned Hinn patent, control circuits respond to a periodically derived signal with a magnitude representative of the cathode black current level. The derived signal exhibits a prescribed level other than zero when the black current level is correct, and different levels (e.g., more or less positive) when the black current level is too high or too low. The derived signal is developed at a sensing point which is coupled to control circuits including clamping and sampling networks for developing a kinescope bias correction signal in accordance with the magnitude of the derived signal. The bias correction signal increases or decreases as required to maintain a correct black current level.

It is herein recognized that the control circuits to which the sense point is coupled can be adversely affected when the sense point from which the black current representative signal is derived exhibits impedance variations as a function of the kinescope driver bias level. Accordingly, there is disclosed herein apparatus for substantially negating the effect of such impedance variations upon the control circuits. The disclosed apparatus also advantageously increases the immunity of a clamping network, associated with the control circuits, to spurious signals including locally generated interference which could otherwise distort or obscure the bias correction signal.

In accordance with the present invention, automatic kinescope bias control apparatus includes a capacitor for coupling a derived signal representative of the kinescope black current level, and an auxiliary signal having a prescribed magnitude and sense, to the input of a sampling amplifier. The source of the derived signal exhibits a variable output impedance proportional to the magnitude of the kinescope bias level. The derived representative signal is provided from the variable impedance output of the derived signal source to the capacitor via a coupling impedance. The coupling impedance is large relative to the variable output impedance, for significantly reducing impedance variations presented to the source of the auxiliary signal from the output of the derived signal source.

In accordance with a feature of the invention, the coupling capacitor is included in a clamping network. The coupling impedance additionally increases the immunity of the clamping network response to spurious signals.

In the drawing:

FIG. 1 shows a portion of a color television receiver including an AKB system and associated apparatus according to the principles of the present invention; and FIG. 2. illustrates signal waveforms associated with the operation of the system of FIG. 1.

In FIG. 1, television signal processing circuits 10 provide separated luminance (Y) and chrominance (C) components of a composite color television signal to a luminance-chrominance signal processing network 12. Processor 12 includes luminance and chrominance gain control circuits, DC level setting circuits (e.g., comprising keyed black level clamping circuits), color demodulators for developing r-y, g-y and b-y color difference signals, and matrix amplifiers for combining the latter signals with processed luminance signals to provide low level color image representative signals r, g and b. These signals are amplified and otherwise processed by circuits within video output signal processing networks 14a, 14b and 14c, respectively, which supply high level amplified color image signals R, G and B to respective cathode intensity control electrodes 16a, 16b and 16c of a color kinescope 15. Networks 14a, 14b and 14c also perform functions related to the AKB operation, as will be discussed. Kinescope 15 is of the self-converging in-line gun type with a commonly energized grid 18 associated with each of the electron guns comprising cathode electrodes 16a 16b and 16c.

Since output signal processors 14a, 14b and 14c are similar in this embodiment, the following discussion of the operation of processor 14a also applies to processors 14b and 14c.

Processor 14a includes a kinescope driver stage comprising an input transistor 20 configured as a common emitter amplifier which receives video signal r from processor 12 via an input resistor 21, and an output, high voltage transistor 22 configured as a common base amplifier which together with transistor 20 forms a cascode video driver amplifier. High level video signal R, suitable for driving kinescope cathode 16a, is developed across a load resistor 24 in the collector output circuit of transistor 22. An operating supply voltage for amplifier 20,22 is provided by a source of high DC voltage B+ (e.g., +230 volts). Direct current negative feedback for driver 20, 22 is provided by means of a resistor 25. The signal gain of cascode amplifier 20, 22 is primarily determined by the ratio of the value of feedback resistor 25 to the value of input resistor 21. The feedback network causes a suitably low output impedance to be provided at the output of amplifier 20, 22, and assists to stabilize the DC operating level at the amplifier output.

A sensing resistor 30 DC coupled in series with and between the collector-emitter paths of transistors 20, 22 serves to develop a voltage at a relatively low voltage sensing node A representing the level of kinescope cathode black current conducted during kinescope blanking intervals. Resistor 30 functions in conjunction with the AKB system of the receiver, which will now be described.

A timing signal generator 40 containing logic control circuits responds to periodic horizontal synchronizing rate signals (H) and to periodic vertical synchronizing rate signals (V), both derived from deflection circuits of the receiver, for generating timing signal $V_B$, $V_S$, $V_C$, $V_P$ and $V_G$ which control the operation of the AKB function during periodic AKB intervals. Each AKB interval begins shortly after the end of the vertical retrace interval within the vertical blanking interval, and encompasses several horizontal line intervals also within the vertical blanking interval and during which video signal image information is absent. These timing signals are illustrated by the waveforms in FIG. 2.

Referring to FIG. 2 for the moment, timing signal $V_B$, a signal used for inhibiting the video signals produced by processor 12, comprises a positive pulse generated soon after the vertical retrace interval ends at time $T_1$, as indicated by reference to signal waveform V. Inhibit signal $V_B$ exists for the duration of the AKB interval and is applied to a blanking control input terminal of luminance-chrominance processor 12 for causing the r, g and b outputs of processor 12 to exhibit a black image representative DC reference level corresponding to the absence of video signals. This can be accomplished by reducing the signal gain of processor 12 to substantially zero via the gain control circuits of processor 12 in response to signal $V_B$, and by modifying the DC level of the video signal processing path via the DC level control circuits of procesor 12 to produce a black image representative reference level at the signal outputs of processor 12. Timing signal $V_G$, used as a positive grid drive pulse, encompasses three horizontal line intervals within the vertical blanking interval. Timing signal $V_C$ controls the operation of a clamping circuit associated with the signal sampling function of the AKB system. Timing signal $V_S$, used as a sampling control signal, occurs after signal $V_C$ and serves to time the operation of a sample and hold circuit which develops a DC bias control signal for controlling the kinescope cathode black current level. Signal $V_S$ encompasses a sampling interval the beginning of which is slightly delayed relative to the end of the clamping interval encompassed by signal $V_C$, and the end of which substantially coincides with the end of the AKB interval. A negative-going auxiliary pulse $V_P$ coincides with the sampling interval. Signal timing delays $T_D$ indicated in FIG. 2 are on the order of 200 nanoseconds.

Referring again to FIG. 1, during the AKB interval positive pulse $V_G$ (e.g., on the order of +10 volts) forward biases grid 18 of the kinescope, thereby causing the electron gun comprising cathode 16a and grid 18 to increase conduction. At times other than the AKB intervals, signal $V_G$ provides the normal, less positive, bias for grid 18. In response to positive grid pulse $V_G$, a similarly phased, positive current pulse appears at cathode 16a during the grid pulse interval. The amplitude of the cathode output current pulse so developed is proportional to the level of cathode black current conduction (typically a few microamperes).

The induced positive cathode output pulse appears at the collector of transistor 22, and is coupled to the base input of transistor 20 via resistor 25, causing the current conduction of transistor 20 to increase proportionally while the cathode pulse is present. The increased current conducted by transistor 20 causes a voltage to be developed across sensing resistor 30. This voltage is in the form of a negative-going voltage change which appears at sensing node A and which is proportional in magnitude to the magnitude of the black current representative cathode output pulse. The magnitude of the voltage change at node A is determined by the product of the value of resistor 30 times the magnitude of the current flowing through resistor 30.

The voltage change at node A is coupled via a small resistor 31 to a node B at which a voltage change $V_1$, essentially corresponding to the voltage change at node A, is developed. Node B is coupled to a bias control voltage processing network 50. Network 50 includes an input coupling capacitor 51, an input clamping and sampling operational amplifier 52 (e.g., an operational transconductance amplifier) with an associated feedback switch 54 responsive to clamping timing signal $V_C$, and an average responding charge storage capacitor 56 coupled to the output of amplifier 52 through a switch 55 responsive to sampling timing signal $V_S$. The voltage developed across capacitor 56 is used to supply a kinescope bias correction signal via network 58 and resistor network 60, 62, 64 to the kinescope driver via a bias control input at the base of transistor 20. Network 58 includes signal translating and buffer circuits for supplying the bias control voltage at a suitable level and low impedance in accordance with the bias control input requirements of transistor 20.

The operation of the system of FIG. 1 will now be discussed with specific reference to the waveforms of FIG. 2. Auxiliary signal $V_P$ is applied to circuit node B in FIG. 1 via a diode 35 and a voltage translating impedance network comprising resistors 32 and 34, e.g., with values of 220 kilohms and 270 kilohms, respectively. Signal $V_P$ exhibits a positive DC level of approximately 8.0 volts at all times, except during the AKB sampling interval, for maintaining diode 35 conductive so that a normal DC bias voltage is developed at node B. When the positive DC component of signal $V_P$ is present, the junction of resistors 32 and 34 is clamped to a voltage equal to the positive DC component of signal $V_P$, minus the voltage drop across diode 35. Signal $V_P$ manifests a negative-going, less positive fixed amplitude pulse component during the AKB sampling interval, which renders diode 35 non-conductive and unclamps the junction of resistors 32 and 34. Resistor 31 causes insignificant attenuation of the voltage change developed at node A relative to the corresponding voltage change ($V_1$) developed at node B since the value of resistor 31 (on the order of 200Ω) is small relative to the values of resistors 32 and 34.

Prior to the clamping interval, but during the AKB interval, the pre-existing nominal DC voltage ($V_{NOM}$) appearing at node B charges the positive terminal of capacitor 51. During the clamping interval when grid drive pulse $V_G$ is developed, the voltage at node A decreases in response to pulse $V_G$ by an amount representative of the black current level. This causes the voltage at node B to decrease to a level substantially equal to $V_{NOM}-V_1$. Also during the clamping interval, timing signal $V_C$ causes clamping switch 54 to close (i.e., conduct) whereby the inverting (−) signal input of amplifier 52 is coupled to its output, thereby configuring amplifier 52 as a unity gain follower amplifier. As a result, a source of fixed DC reference volta $V_{REF}$ (e.g., +5 volts) applied to a non-inverting input (+) of amplifier 52 is coupled by feedback action to the inverting signal input of amplifier 52 via the output of amplifier 52 and conductive switch 54. Thus during the clamping interval the voltage $V_3$ across capacitor 51 is a function of a reference set-up voltage determined by voltage $V_{REF}$ at the negative terminal of capacitor 51, and a voltage at the positive terminal of capacitor 51 corresponding to the difference between the described pre-existing nominal DC level ($V_{NOM}$) at node B and voltage change $V_1$ developed at node B during the clamping interval. Thus voltage $V_3$ across capacitor 51 during the clamping reference interval is a function of the level of black current representative voltage change $V_1$, which may vary. Voltage $V_3$ can be expressed as $(V_{NOM}-V_1)-V_{REF}$.

During the immediately following sampling interval, positive grid drive pulse $V_G$ is absent, causing the voltage at node B to increase positively to the pre-existing nominal DC level $V_{NOM}$ that appeared prior to the clamping interval. Simultaneously, negative pulse $V_P$ appears, reverse biasing diode 35 and perturbing (i.e., momentarily changing) the normal voltage translating and coupling action of resistors 32,34 such that the voltage at node B is reduced by an amount $V_2$ as indicated in FIG. 2. At the same time, clamping switch 54 is rendered non-conductive and sampling switch 55 closes (conducts) in response to signal $V_S$ whereby charge storage capacitor 55 is coupled to the output of amplifier 52.

Thus during the sampling interval the input voltage applied to the inverting signal input (−) of amplifier 52 is equal to the difference between the voltage at node B and voltage $V_3$ across input capacitor 51. The input voltage applied to amplifier 52 is a function of the magnitude of voltage change $V_1$, which can vary with changes in the kinescope black current level.

The voltage on output storage capacitor 56 remains unchanged during the sampling interval when the magnitude of voltage change $V_1$ developed during the clamping interval equals the magnitude of voltage change $V_2$ developed during the sampling interval, indicating a correct kinescope black current level. This results because during the sampling interval, voltage change $V_1$ at node B increases in a positive direction (from the clamping set-up reference level) when the grid drive pulse is removed, and voltage change $V_2$ causes a simultaneous negative-going voltage perturbation at node B. When kinescope bias is correct, positive-going voltage change $V_1$ and negative-going voltage change $V_2$ exhibit equal magnitudes whereby these voltage changes mutually cancel during the sampling interval, leaving the voltage at node B unchanged.

When the magnitude of voltage change $V_1$ is less than the magnitude of voltage change $V_2$, amplifier 52 proportionally charges storage capacitor 56 in a direction for increasing cathode black current conduction. Conversely, amplifier 52 proportionally discharges storage capacitor 56 for causing decreased cathode black current conduction when the magnitude of voltage change $V_1$ is greater than the magnitude of voltage change $V_2$.

As more specifically shown by the waveforms of FIG. 2, the amplitude "A" of voltage change $V_1$ is assumed to be approximately six millivolts when the cathode black current level is correct, and varies over a range of a few millivolts ($\pm\Delta$) as the cathode black current level increases and decreases relative to the correct level as the operating characteristics of the kinescope change. Thus the clamping interval set-up reference voltage across capacitor $V_3$ varies with changes in the magnitude of voltage $V_1$ as the cathode black current level changes. Voltage change $V_2$ at node B exhibits an amplitude "A" of approximately six millivolts, which corresponds to amplitude "A" associated with voltage change $V_1$ when the black current level is correct.

As indicated by waveform $V_{COR}$ in FIG. 2, the voltage at the inverting input of amplifier 52 remains unchanged during the sampling interval when voltages $V_1$ and $V_2$ are both of amplitude "A". However, as indicated by waveform $V_H$, the input voltage of amplifier 52 increased by an amount $\Delta$ when voltage change $V_1$ exhibits amplitude "A$\pm\Delta$", corresponding to a high black current level. In this event amplifier 52 discharges output storage capacitor 56, so that the bias control voltage applied to the base of transistor 20 causes the collector voltage of transistor 22 to increase, whereby the cathode black current decreases toward the correct level.

Conversely, and as indicated by waveform $V_L$, the input voltage of amplifier 52 decreases by an amount $\Delta$ during the sampling interval when voltage change $V_1$ exhibits amplitude "A$-\Delta$", corresponding to a low black current level. In this case amplifier 52 charges output storage capacitor 56, causing the collector voltage of transistor 22 to decrease whereby the cathode black current increases toward the correct level. In either case, several sampling intervals may be required to achieve the correct black current level.

Thus the disclosed system automatically produces a zero amplifier output current to storage capacitor 56 when the non-zero amplitude of voltage change $V_1$ corresponds to the correct black current level. Accordingly, manual pre-set bias controls and associated time consuming adjustment are not required for offsetting the sampling amplifier conduction response to produce a zero amplifier output current flow to the storage capacitor when the sampled signal exhibits a magnitude other than zero for correct bias conditions. The described sampling amplifier input signal coupling arrangement employing auxiliary pulse $V_P$ is advantageous in a system wherein sampling amplifier 52 comprises a differential input amplifier, such as an emitter coupled differential amplifier as discussed in concurrently filed copending U.S. patent application Ser. No 434,314 of R. P. Parker titled "Signal Processing Network For An Automatic Kinescope Bias Control System", filed Oct. 14, 1982, incorporated herein by reference. This copending application also discloses additional information concerning the arrangement including auxiliary control signal $V_P$, as well as disclosing a suitable arrangement for timing signal generator 40 shown in FIG. 1.

In some AKB systems it may be desirable to develop black current representative voltage change $V_1$ during the sampling interval, rather than during the preceding clamping interval as described previously. In such an alternative system grid drive pulse $V_G$ would be timed to occur during the sampling interval, coincident with a positive auxiliary pulse $V_P$. The negative-going voltage change $V_1$ and the positive-going voltage change $V_2$ developed in response to auxiliary signal $V_P$ then occur simultaneously and combine directly at node B such that they mutually cancel when the black current level is correct (i.e., no voltage change is produced at node B). Additional details of this alternative technique are found in the aforementioned copending patent application of R. P. Parker.

The voltage developed at node B during the AKB clamping and sampling intervals is a function of the values of resistors 31, 32 and 34, and the value of an impedance, $Z_o$, appearing at node A. When signal $V_P$ manifests the positive DC level (+8 volts) such as during the clamping interval, the junction of resistors 32 and 34 is voltage clamped and a current conducted by resistor 31 from node A to node B is a function of the values of $Z_o$, resistor 31 and resistor 34. During the subsequent sampling interval when the negative-going pulse component of signal $V_P$ is present, diode 35 is non-conductive and the junction of resistors 32 and 34 is unclamped. At this time a different current is conducted by resistor 31 from node A to node B as a function of the value of resistor 32, in addition to the values of $Z_o$ and resistors 31, 34. Voltage change $V_2$ developed at node B in response to the negative-going pulse component of signal $V_P$ is proportional to the difference between these currents.

The described combined-pulse sampling arrangement also advantageously provides a convenient mechanism for compensating for mutually different conduction (gain) characteristics an correspondingly different cut-off voltages of the kinescope electron guns, due to kinescope manufacturing tolerances, for example. This aspect of the disclosed arrangement is discussed in detail in a copending, concurrently filed U.S. patent application of R. P. Parker Ser. No. 434,328. filed Oct. 14,1982, titled "Automatic Kinescope Bias Control System Compensated for Kinescope Electron Gun Conduction Dissimilarities", and is discussed briefly below.

When the kinescope electron guns are identical and thereby exhibit the same conduction characteristics, they will conduct equal black level currents and exhibit equal cut-off voltages (i.e., grid-to-cathode voltage). In practice, however, the electron guns exhibit mutually different conduction characteristics. In the latter case the different currents conducted by the electron guns are considered to be the correct black level currents, and the AKB system should remain quiescent and should not alter the kinescope bias even though the electron guns exhibit mutually different black current levels and mutually different associated cut-off voltages.

This result is achieved by the disclosed arrangement since the magnitude of voltage change $V_2$ developed at node B is predictably linearly proportional to the DC voltage component appearing at node A. This DC voltage component is proportional to the cathode cut-off voltage as manifested by the DC voltage component at the output of driver transistor 22, corresponding to the cathode voltage, during the AKB interval (neglecting the effect of the induced cathode output current pulse developed in response to positive grid drive pulse $V_G$). Thus if the three kinescope electron guns exhibit mutually different currents and cut-off voltages corresponding to initial black level set-up conditions, voltage changes $V_2$ respectively associated with signal processors 14a, 14b and 14c each exhibit different magnitudes, even though each is derived from a common signal $V_P$. The different magnitudes of voltage changes $V_2$ are a function of the different cut-off voltages as manifested by the DC components of different magnitudes developed at nodes A. The different magnitudes of voltage changes $V_2$ are such that, for the associated AKB control loop, the voltage developed at node B does not change when voltage changes $V_1$ and $V_2$ are combined, so that each AKB control loop remains quiescent. The AKB control loops will remain quiescent until the initially established black level electron gun currents change due to a change in the operating parameters of the kinescope because of kinescope aging or temperature effects.

It is noted that the impedance seen at sensing node A during AKB intervals varies as a function of the kinescope electron gun characteristic and corresponding cathode cut-off voltage associated with a given correct black current level. The desired effect whereby the magnitude of voltage change $V_2$ at node B is predictably proportional to the DC voltage component at node A and to the cathode cut-off voltage, would not be achieved if the impedance variations at node A were not compensated for. In systems which do not require that the magnitude of voltage change $V_2$ be proportional to the cathode cut-off voltage, impedance variations at node A would nevertheless render the magnitude of voltage change $V_2$ undesirably unpredictable.

Node A can be modeled as a voltage source in series with impedance $Z_o$ mentioned previously. The value of impedance $Z_o$ is a function of the value of sense resistor 30, divided by a control loop gain factor which is a function of the operating point of transistor 20. The operating point of transistor 20 during AKB intervals is proportional to the cathode cut-off voltage. In practice, it has been found that impedance $Z_o$ can exhibit minimum and maximum values of 30Ω and 50Ω, respectively, under correct black current conditions. Thus the value of $Z_o$ at point A can vary by 67% from a minimum value.

Resistor 31 compensates for the impedance variation at node A such that the impedance variation does not compromise the intended operation of the auxiliary pulse circuit including signal source $V_P$, diode 35 and resistors 32, 34. In this example the value of resistor 31, which is not critical, is on the order of 200Ω. Thus the total impedance presented to node B from node A comprises resistor 31 and impedance $Z_o$, and varies from 230Ω to 250Ω with variations of impedance $Z_o$ at node A. Accordingly, node B is presented with acceptably small impedance variations of less than 10% under correct black current conditions, which is significantly less than the 67% impedance variation present in the absence of resistor 31. Stated otherwise, the impedance presented to node B varies by only ±4% with respect to a nominal value of 40Ω for impedanc $Z_o$.

Resistor 31 also advantageously increases the immunity of clamping and sampling network 50 to spurious signals which can distort or obscure the bias control voltage ultimately developed on storage capacitor 56. Of primary concern here are periodic spurious signals such as locally generated alternating current interference signals sometimes referred to as "raster rings". The latter signals occur periodically at the horizontal line rate (approximately 15,734 Hz.) and comprise damped oscillatory pulse signals with an average value of substantially zero. These signals are generated by deflection circuits of the receiver during horizontal image retrace intervals (i.e., including intervals when the AKB system operates), and can be coupled to the AKB system via power supply connections and via the luminance and chrominance signal processing circuits. Spurious signals are particularly troublesome in an AKB system because they can exhibit magnitudes which are significant relative to the small signals (i.e., on the order of a few millivolts) processed by the AKB system. The impact of spurious signals can be reduced by employing separate filtering and shielding techniques, but these are more complex and costly alternatives.

The voltage developed across clamp capacitor 51 (0.12 μf) during the clamping interval can be seriously affected by spurious signals such as "raster rings", which exhibit a significant non-zero amplitude and occur at the end of the clamping interval (i.e., close in time to when feedback switch 54 opens). In the absence of resistor 31, capacitor 51 can charge to a voltage equal to 67% of the peak amplitude of the spurious raster ring signal, causing the clamping reference voltage developed across capacitor 51 to manifest a serious error. This error is significantly reduced by the presence of resistor 31, as follows.

During the clamping interval, signals including a DC component and the alternating current raster ring signals are supplied to the positive terminal of capacitor 51 via an impedance $Z_B$ (approximately 240 ohms), corresponding to the series combination of impedance $Z_o$ at node A and resistor 31. Reference voltage $V_{REF}$ is supplied to the negative terminal of capacitor 51 via a low impedance, $Z_A$, corresponding to the low output impedance of amplifier 52, which acts as a voltage follower during the clamping interval. Impedance $Z_A$ is significantly less than impedance $Z_B$. The magnitude of a reactive impedance $Z_C$ exhibited by capacitor 51 in the presence of the horizontal rate raster ring signals is approximately 84 ohms. The alternating current component of the spurious signals through capacitor 51 is significantly attenuated by the ratio of impedance $Z_C$ to the sum of impedance $Z_A$, $Z_B$ and $Z_C$ such that capacitor 51 can charge to a voltage equal to only approximately 25% of the peak amplitude of the raster ring signal. Accordingly, clamp capacitor 51 responds more closely to the average value of signals from node A, and the amplitude peaks of the spurious signals have a much less significant impact upon the clamping reference voltage developed by capacitor 51.

What is claimed is:

1. In a video signal processing system including an image reproducing device responsive to video signals supplied to an intensity control electrode thereof, automatic bias control apparatus comprising:
    means for deriving a signal representative of the black image current level conducted by said intensity control electrode during bias control intervals, said deriving means exhibiting a variable output impedance related to the bias of said intensity control electrode;
    sampling amplifier means with an input and an output, for providing an output bias correction signal to said image reproducing device for maintaining a correct black current level in response to signals applied to said input;
    means for generating an auxiliary control signal having a prescribed magnitude and sense;
    a capacitor for coupling said derived representative signal and said auxiliary signal to said input of said sampling amplifier means; and
    an impedance for coupling said derived representative signal from said output of said deriving means to said capacitor, said impedance being large relative to said variable output impedance for significantly reducing impedance variations presented to said generating means from said output of said deriving means.

2. Apparatus according to claim 1, wherein:
    said derived signal is developed at a first circuit point corresponding to said output of said deriving means;
    said auxiliary signal from said generating means is coupled to said capacitor at a second circuit point;
    said impedance is coupled from said first circuit point to said second circuit point; and
    said generating means comprises
        a source of timing signals exhibiting first and second states, and
        a controllable impedance network coupled to said second circuit point and responsive to said timing signals for exhibiting first and second impedances.

3. Apparatus according to claim 2, wherein:
    said controllable impedance network is coupled to said second circuit point and to a point of reference potential;
    said first impedance exhibited by said controllable impedance network induces a first current between said first and second circuit points primarily as a function of said coupling impedance and said first impedance exhibited by said controllable impedance network;
    said second impedance exhibited by said controllable impedance network induces a second current between said first and second circuit points, different from said first induced current, primarily as a function of said coupling impedance and said second impedance exhibited by said controllable impedance network; and
    said auxiliary signal is proportional in magnitude to the difference between said first and second induced currents.

4. Apparatus according to claim 1, wherein said deriving means comprises:
    amplifier means having a first terminal for receiving video signals to be amplified, a second terminal coupled to said intensity control electrode of said image reproducing device for supplying amplified video signals thereto, and a third terminal coupled to a reference potential and with said second terminal defining a main current conduction path of said amplifier means; and
    feedback means coupled from said second terminal to said first terminal of said amplifier means for causing said main current conduction path of said amplifier means to vary in conduction in accordance with current variations representative of black current variations manifested at said second terminal of said amplifier means; and wherein
    said representative signal is derived from said main current conduction path of said amplifier means.

5. Apparatus according to claim 4 and further comprising:
    a sensing resistance included in said main current conduction path of said amplifier means for developing a voltage thereacross corresponding to said derived signal.

6. Apparatus according to claim 1, wherein said deriving means comprises
a first transistor with a first electrode for receiving video signals to be amplified, a second electrode, and a third electrode coupled to a reference potential;
a second transistor with a first electrode coupled to a bias voltage, a second electrode coupled to an operating supply voltage via a load impedance and coupled to said intensity control electrode for supplying amplified video signal thereto, and a third electrode coupled to said second electrode of said first transistor;
a sensing resistance coupled between said second electrode of said first transistor and said third electrode of said second transistor; and
feedback means coupled from said second electrode of said second transistor to said first electrode of said first transistor for causing the conduction of said first transistor to vary in accordance with current variations representative of black current variations manifested at said second terminal of said second transistor; and wherein
said representative signal is derived from said second electrode of said first transistor.

7. Apparatus according to claim 1 and further comprising:
a source of reference voltage;
a source of switching signals occurring during bias control intervals; and
means responsive to said switching signals for applying said reference voltage at a low impedance to said capacitor at said input of said amplifier means.

8. Apparatus according to claim 1 and further comprising:
a source of DC reference voltage coupled to said amplifier means;
a charge storage device;
a source of switching signals occurring during first and second intervals within a given bias control interval;
switching means coupled to said output of said amplifier means, to said capacitor, and to said charge storage device and being responsive to said switching signals during said first interval for (1) applying said reference voltage at a low impedance to said capacitor at said input of said amplifier means, and (2) decoupling said amplifier output from said charge storage device; said switching means being responsive to said switching signals during said second interval for (3) decoupling said reference voltage source from said capacitor, and (4) coupling said charge storage device to said output of said amplifier means.

9. Apparatus according to claim 8, wherein
said sampling amplifier means comprises an operational amplifier with an inverting signal input coupled to said capacitor and a non-inverting input coupled to said source of reference voltage.

* * * * *